US010228271B2

(12) United States Patent
Jenkins et al.

(10) Patent No.: US 10,228,271 B2
(45) Date of Patent: Mar. 12, 2019

(54) SUPPRESSING REROUTING FOR INTENTIONAL CIRCUMSTANCES

(71) Applicant: International Business Machines Corporation, Armonk, NY (US)

(72) Inventors: Jana H. Jenkins, Raleigh, NC (US); Marylin A. Lincoln, Wake Forest, NC (US); Anuradha Ramamoorthy, Cary, NC (US); Hiroko Takamiya, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 15/290,316

(22) Filed: Oct. 11, 2016

(65) Prior Publication Data

US 2018/0100746 A1 Apr. 12, 2018

(51) Int. Cl.
| | |
|---|---|
| *G01C 21/34* | (2006.01) |
| *G01F 9/00* | (2006.01) |
| *G07C 5/00* | (2006.01) |
| *G01C 21/36* | (2006.01) |

(52) U.S. Cl.
CPC .......... *G01F 9/008* (2013.01); *G01C 21/3415* (2013.01); *G01C 21/3641* (2013.01); *G07C 5/00* (2013.01)

(58) Field of Classification Search
None
See application file for complete search history.

(56) References Cited

U.S. PATENT DOCUMENTS

| | | | | |
|---|---|---|---|---|
| 5,311,434 A | * | 5/1994 | Tamai | ........... G01C 21/3415 340/990 |
| 6,587,785 B2 | | 7/2003 | Jijina et al. | |
| 9,163,951 B2 | | 10/2015 | Su et al. | |

(Continued)

FOREIGN PATENT DOCUMENTS

DE    102010020404 A1    2/2011

OTHER PUBLICATIONS

Peter Mell et al., "The NIST Definition of Cloud Computing", National Institute of Standards and Technology, U.S. Department of Commerce, NIST Special Publication 800-145, Sep. 2011, 7 pages.

*Primary Examiner* — Tamara L Weber
(74) *Attorney, Agent, or Firm* — Heslin Rothenberg Farley & Mesiti P.C.

(57) ABSTRACT

A method, computer program product, and system for suppressing rerouting in a navigational system which includes a processor monitoring movements of a vehicle relative to a planned route generated by a navigational system, where the planned route includes a trip from a point of origin to a destination and the navigational system includes program(s) providing navigational assistance to a driver during the trip. The processor detects a first movement of the vehicle which is a deviation from the planned route. The processor determines that the deviation is based on an intentional circumstance. The processor suppresses execution of rerouting functionality of the navigational system and pauses the program(s) providing navigational assistance. The processor detects a second movement of the vehicle that includes a resumption of the planned route and resumes the program(s) providing navigational assistance.

19 Claims, 5 Drawing Sheets

(56) References Cited

U.S. PATENT DOCUMENTS

| | | | | |
|---|---|---|---|---|
| 2009/0326991 A1* | 12/2009 | Wei | ........................ | G06Q 10/02 |
| | | | | 705/5 |
| 2011/0140877 A1* | 6/2011 | Gilchrist | ................ | B60K 15/04 |
| | | | | 340/450.2 |
| 2013/0013192 A1* | 1/2013 | Yakali | ................ | G01C 21/3407 |
| | | | | 701/424 |
| 2014/0309806 A1* | 10/2014 | Ricci | ........................ | B60Q 1/00 |
| | | | | 701/1 |
| 2016/0364922 A1* | 12/2016 | Sahinoglu | ............... | G01S 19/42 |

* cited by examiner

US 10,228,271 B2

SUPPRESSING REROUTING FOR INTENTIONAL CIRCUMSTANCES

BACKGROUND

Global Positioning System (GPS) navigation systems are commonly utilized by consumers for navigation to various destinations, including destinations that the user of the system has not previously visited. During a trip, unplanned and unexpected stops may occur, for example, to get gas. When an individual makes these stops, the GPS navigation system responds to the deviation from the planned route by recalculating the route to the destination. The route recalculation can prove cumbersome and distracting for the passenger, as well as being an inefficient use of the resources of the GPS navigation system.

SUMMARY

Shortcomings of the prior art are overcome and additional advantages are provided through the provision of a method for suppressing rerouting in a navigational system. The method includes, for instance: monitoring, by one or more processors, movements of a vehicle relative to a planned route generated by a navigational system, wherein the planned route comprises a trip from a point of origin to a destination and the navigational system comprises one or more programs providing navigational assistance to a driver during the trip; detecting, by the one or more processors, a first movement of the vehicle comprising a deviation from the planned route; determining, by the one or more processors, that the deviation is based on an intentional circumstance; based on the determining, suppressing, by the one or more processors, execution of one or more programs comprising rerouting functionality of the navigational system and pausing the one or more programs providing navigational assistance; detecting, by the one or more processors, a second movement of the vehicle comprising a resumption of the planned route; and resuming, by the one or more processors, the one or more programs providing navigational assistance.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
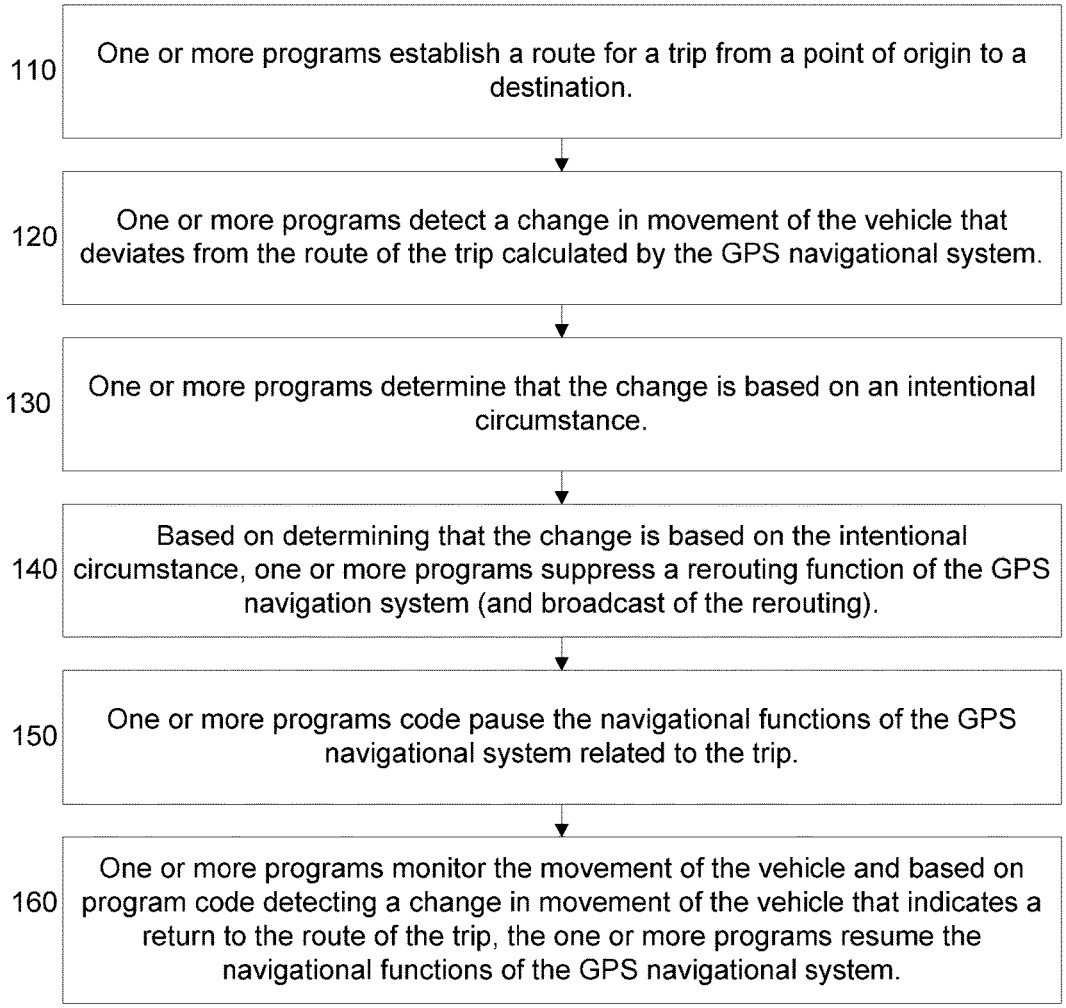
FIG. 1 depicts a workflow illustrating certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 3:
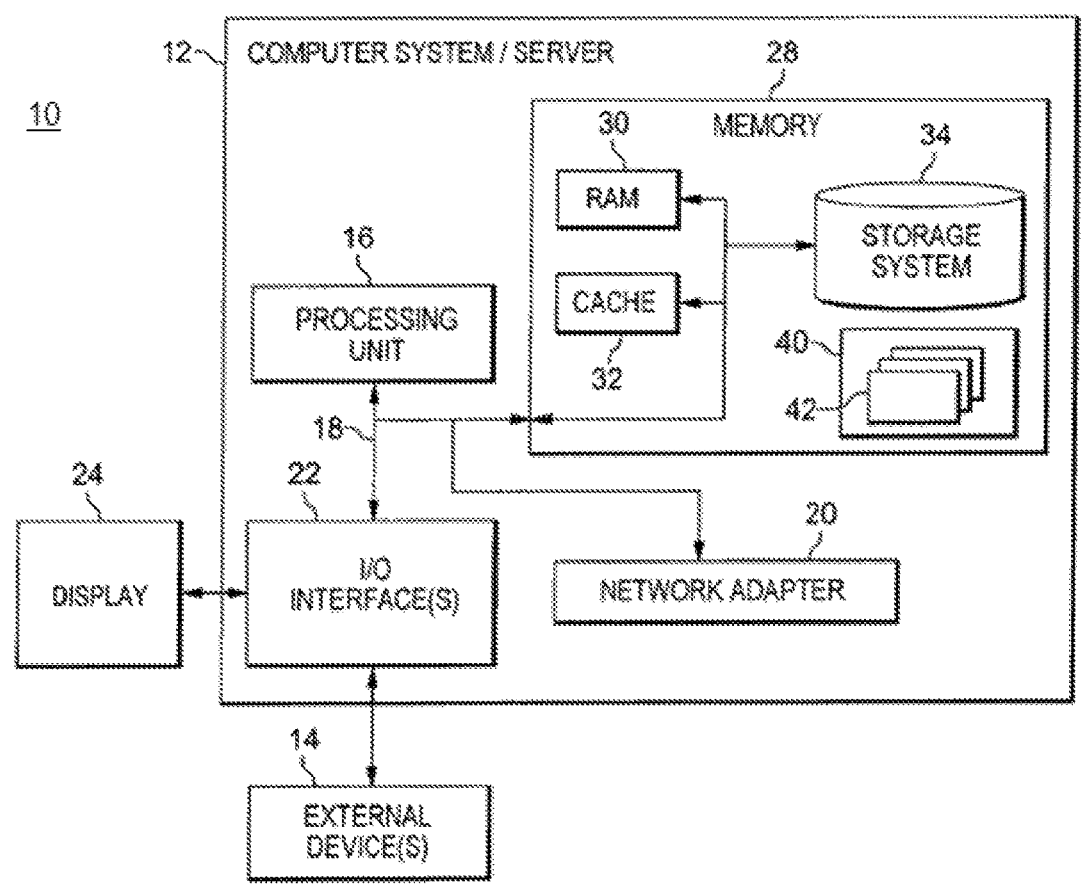
FIG. 3 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 3 as program/utility 40, having a set (at least one) of program modules 42, may be stored in memory 28.

A GPS (location-based) navigation service or system, (referred to herein as a GPS navigation system) in a computing device, utilizes time and computing resources when calculating or recalculating a route. Accuracy and Time To First Fix (TTFF) are critical parameters for any GPS navigation system. TTFF is the measure of time required for a GPS receiver to acquire satellite signals and navigation data, and calculate a position solution, which is called a "fix," a position derived from measuring external reference points. One of the major issues in obtaining a GPS fix is to locate the appropriate satellites in the constellation. GPS navigation satellites transmit electronic ephemeris data consisting of health and exact location data that GPS receivers then use (together with the signal's elapsed travel time to the receiver) to calculate their own location on Earth, using trilateration. This ephemeris data is broadcast from the satellites and is used to locate the satellite. However, location of the ephemeris data from the satellite can be slow and problematic and storing ephemeris data locally in an almanac of the satellite position(s) has drawbacks, including that the data has a shelf-life. Thus, because utilizing a GPS navigation system to compute a travel route can be resource and time intensive for the system, the efficiency of the system is increased by avoiding unnecessary recalculation of routes. For example, if a driver takes a wrong turn, he or she may benefit from program code executing on the GPS navigation system recalculating the route. However, should a driver take a brief stop for gas or a snack, the program code recalculating the route in this instance would be unnecessary and thus, inefficient. However, most GPS navigation systems will recalculate a route automatically based on a user straying from a calculated route, negatively impacting for the user experience as well as the efficiency of the GPS navigation system itself.

Certain embodiments of the present invention include aspects that address this particular challenge in computing, i.e., dynamically rerouting a GPS navigation (trip plan) based on an intended task (e.g., a stop for fuel) without specifying a location for the task, and suppressing an automatic rerouting (and broadcast of the rerouting) by program code executing on a processing resource of the GPS navigation system, based on a shortest route. Aspects of embodiments of the present invention represent an improvement over existing GPS navigation systems because these aspects enable a GPS navigation system to stop rerouting automatically, increasing both the efficiency of the GPS navigation system itself, as well as improving the user experience.

Embodiments of the present invention provide advantages that increase vehicle and road safety. Because aspects of embodiments of the present invention include program code that automatically suppresses rerouting of the GPS navigational system, the driver of the vehicle can focus on driving and on the road, rather than devote attention to correcting the navigation. For example, in an embodiment of the present invention, when the gas level in a vehicle is low and a driver is engaged in driving to a gas station, which is not part of the planned trip route, existing systems would automatically re-calculate the route to the final destination and continuously convey the ever-changing rerouted directions to the driver, potentially distracting the driver from the task at hand. Instead, in an embodiment of the present invention, program code monitors the fuel levels in the vehicle, so when the driver deviates from the route when fuel is low, the program code automatically stops the GPS navigational system from rerouting. In addition, based on this data regarding the fuel level of the vehicle, in an embodiment of the present invention, the program code monitors both the gas levels and upcoming service stop exits.

Embodiments of the present invention include program code executed on at least one processing circuit that dynamically reroutes a GPS navigation system based on a preference change. To this end, the program code, which may comprise one or more programs in a GPS navigational system, detects a change in route that deviates from a previously calculated trip. The program code determines when the change is based on an intended circumstance and is therefore a change in route intended by the user. Based on determining that the change was based on the intended circumstance, the program code suppresses a rerouting function of the GPS navigation system, which would include broadcast of the rerouting. In an embodiment of the present invention, in addition to suppressing the rerouting functionality of the GPS navigational system, the program code may pause the navigational assistance while the user's vehicle is moving outside of the GPS navigational system's original route. In an embodiment of the present invention, the program code will resume navigational assistance based on determining that the vehicle (in which the GPS navigational system is situated) has returned to the original route. In an embodiment of the present invention, the program code will cease suppressing the recalculation and because the vehicle has returned to the planned route, the GPS navigational system will resume navigational assistance automatically.

In various embodiments of the present invention, the program code may determine that the change is based on an intentional circumstance automatically or based on user input. For example, in an embodiment of the present invention, when the program code detects a change in the route, the program code prompts the driver (user) to confirm that the change was based on an intended circumstance. For example, in an embodiment of the present invention, utilizing voice simulation capabilities of the GPS navigational system, the program code queries the user regarding the change. Based on receiving a voice confirmation that the change was intentional, the program code suppresses the rerouting functionality. In an embodiment of the present invention, based on receiving a response indicating that the change was not intentional or failing to receive a confirmation after a pre-defined period of time, the program code will not suppress the rerouting functionality, enabling one or more programs in the GPS navigational system to perform rerouting.

In an embodiment of the present invention, the program code retains data related to intentional circumstances, where no rerouting of the navigation was required, during past trips, and utilizes this saved data when determining whether to suppress rerouting capabilities on future trips. For example, a given driver may regularly stop at a given gas station or at a given refreshment location and the program code may retain these locations in a memory (internal or accessible to the program code over a network connection). Thus, in some embodiments of the present invention, the program learns (e.g., by utilizing a machine learning algorithm) to add frequently used gas/biological/food locations to memory without having the driver configure these stops in the GPS. In an embodiment of the present invention, the program asks (e.g., via voice simulation) the driver if rerouting is necessary according to its proximity to these locations, when the program code detects a change in route. Thus, in an embodiment of the present invention, based on past information, the program code automatically suppresses rerouting functionality of a given trip.

In an embodiment of the present invention, the program code may leverage map data available in the GPS system to determine the purpose behind a deviation form a planned route. For example, the program code may access mapping data and determine that a deviation from a planned route is because the user is stopping for gas because, according to the map data, the deviation orients the vehicle toward a gas station. Based on this information, the program code automatically suppresses rerouting functionality during the trip to the gas station.

In an embodiment of the present invention, the program code may interface with computing systems within the vehicle to determine that a movement of the vehicle that is not part of the planned navigation is intentional and thus, suppress the rerouting functionality. For example, the program code may sense an event in the vehicle that would require a stop, including but not limited to, a low gas reading, low air in a tire, low fluid, and/or a warning light. The program code may also determine that a deviation from the planned route is intentional based on circumstances related to the vehicle that are not potential safety hazards. For example, the program code may obtain information indicating that there is a car seat installed in the vehicle. With this information, should the driver deviate from the planned route, the program code will suppress rerouting, based on determining that the change is related to meeting a need of a passenger in the car seat, for example, a diaper change or a food break. In an embodiment of the present invention, the program code may solicit a vocal confirmation that this change is intentional before suppressing the rerouting.

In an embodiment of the present invention, the program code may also suppress the rerouting based on a user event. For example, the GPS navigational system may communicate over a network, including the Internet, with wearable electronic devices associated with the driver and/or passengers in the vehicle. The program code of the GPS navigational system monitors the biological readings taken by the wearable devices, such as blood sugar levels, and based on the vehicle deviating from the route when a wearable device indicates a problematic sugar level, the program code may determine that the deviation is based on an intentional circumstance and suppress the rerouting of the GPS navigational system. In an embodiment of the present invention, the program code may solicit a voice command to confirm that the deviation is intentional before suppressing the rerouting functionality.

FIG. 1 is a workflow 100 that illustrates various aspects of an embodiment of the present invention. As explained above, embodiments of the present invention provide an enhancement to a navigational system in a vehicle (e.g., a GPS navigational system) by suppressing rerouting of a given trip when the vehicle deviates from the route intentionally, for example, to meet a temporary need. The navigational system can be a stand-alone GPS navigational unit and can also be a navigational application, executing program code, for example, or a personal computing device utilized by an individual in the vehicle. In an embodiment of the present invention, one or more programs related to aspects of the present invention may be executed on a mobile computing device within a vehicle and may interface with a separate computing node that executes one or more programs of the traditional GPS navigational system. These separate nodes may communicate over a wired or wireless network, including over an Internet connection.

In an embodiment of the present invention, program code (e.g., one or more programs of the navigational system of the vehicle) establishes a route for a trip from a point of origin to a destination (110). The manner in which a GPS navigational system establishes a location of a device (i.e., the point of origin) is discussed above. As understood by one of skill in the art, establishing an initial route for a trip from an origin to a destination by utilizing a GPS navigational system is known and aspects of the present invention are compatible with existing routing software that establishes routes for trips.

In an embodiment of the present invention, prior to reaching the destination, the program code detects a change in movement of the vehicle that deviates from the route of the trip calculated by the GPS navigational system (120). In an embodiment of the present invention, the program code that detects the change may interface with location services in the GPS navigational system to determine that the change in movement has occurred.

In an embodiment of the present invention, the program code determines that the change is based on an intentional circumstance (130). As explained above, in some embodiments of the present invention, the program code makes this determination based on monitoring systems within the vehicle over a communications connection with the vehicle's computer and obtaining data indicating a condition within the vehicle (e.g., low fuel), based on communicating with wearable devices, worn by the driver or passengers in the car indicating a biological condition, and/or based on determining that the deviation is based on traveling to a frequently used and/or pre-configured gas/biological/food location.

In an embodiment of the present invention, based on determining that the change is based on the intentional circumstance, the program code suppresses a rerouting function of the GPS navigation system (and broadcast of the rerouting) (140). In an embodiment of the present invention, the program code pauses the navigational functions of the GPS navigational system related to the trip (e.g., recitation of directions by one or more programs of the GPS navigational system) (150). The program code monitors the movement of the vehicle, for example, by interfacing with the location services in the GPS navigational system, and based on program code detecting a change in movement of the vehicle that indicates a return to the route of the trip, the program code resumes the navigational functions of the GPS navigational system (160).

The program code may resume the navigational functions of the GPS navigational system upon determining that the intentional circumstance has ended. For example, in an embodiment of the present invention, the program code determines, based on monitoring the fuel levels of the vehicle, that the vehicle has deviated from the route because the fuel level is low. The program code continues to monitor the fuel level and resumes the navigational functions of the GPS once it determines that the fuel level is no longer low, i.e., the tank has been filled.

In an embodiment of the present invention, the program code receives an indication from the user that the driver will be deviating from the trip route (e.g., for gas, coffee, food, etc.) and based on having received this indication, when the program code detects a change in movement of the vehicle that deviates from the trip (120), the program code determines that the change is based on an intentional circumstance (130).

Figure 2:
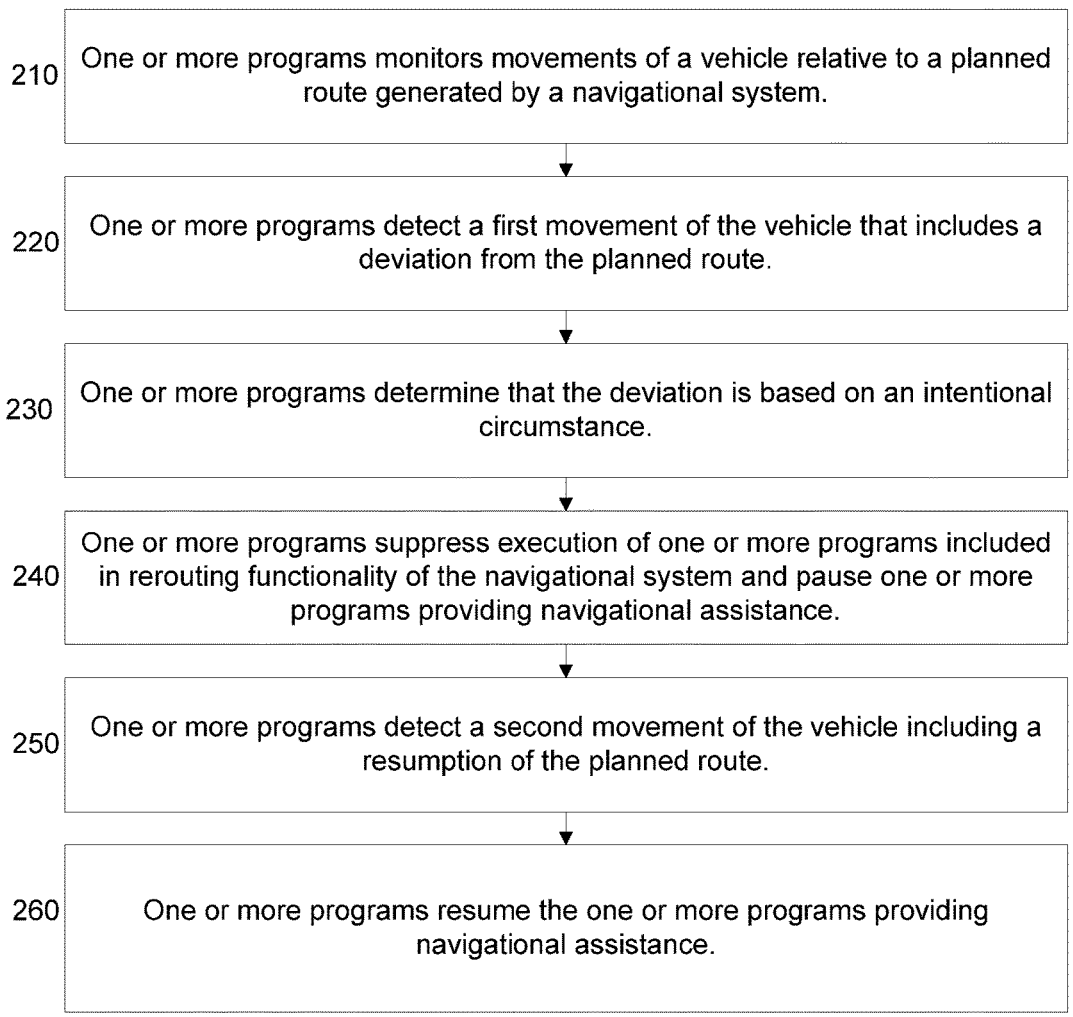
FIG. 2 depicts a workflow illustrating certain aspects of an embodiment of the present invention.

FIG. 2 is another workflow 200 that illustrates various aspects of some embodiments of the present invention. As illustrated in FIG. 2, embodiments of the present invention include computer-implemented methods, computer program products, and computing systems that suppress the rerouting functionality of a navigational system. In an embodiment of the present invention, program code executing on at least one processing circuit monitors movements of a vehicle relative to a planned route generated by a navigational system; the planned route includes a trip from a point of origin to a destination and the navigational system includes one or more programs providing navigational assistance to a driver during the trip (210). The monitoring may include utilizing location services in the navigational system.

The program code detects a first movement of the vehicle that includes a deviation from the planned route (220).

The program code determines that the deviation is based on an intentional circumstance (230). In an embodiment of the present invention, the program code determines that the deviation is based on an intentional circumstance by obtaining, from a computing resource in the vehicle over a network connection, an indication of a safety issue related to the vehicle, and determining, based on the safety issue, that the deviation is to address the safety issue. Examples of safety issues for which the program code receives as indication may include, but are not limited to: a low fuel warning, a low air in a tire warning, and a low fluid warning.

In an embodiment of the present invention, the program code monitors a fuel system in the vehicle and obtains an indication that the fuel system is low on fuel. In this example, the first movement is based on the intentional circumstance of refueling the vehicle.

In an embodiment of the present invention, the program code obtain parameters defining an intentional circumstance. The program code therefore determines that the movement is based on an intentional circumstance by determining that the intentional circumstance has occurred. For example, when the intentional circumstance is an intention to stop at a defined location during the trip, the program code determines that the intentional circumstance has occurred by utilizing the navigational system to locate the defined location and determining that the first movement positions the vehicle on a route to the defined location.

In an embodiment of the present invention, as part of determining that the deviation is based on an intentional circumstance, the program code requests confirmation that the deviation is based on an intentional circumstance and obtains the confirmation. The confirmation may be accomplished with a voice command.

Returning to FIG. 2, based on the determining, the program code suppresses execution of one or more programs included in rerouting functionality of the navigational system and pauses the one or more programs providing navigational assistance (240). The program code detects a second movement of the vehicle including a resumption of the planned route (250). The program code resumes the one or more programs providing navigational assistance (260).

In an embodiment of the present invention, the program code also monitors movements of a vehicle that are deviations from the planned route. The program code retains, in at least one memory resource, other destinations visited by the vehicle based on the deviations. The program code may then determine that the deviation is based on an intentional circumstance by determining that the first movement positions the vehicle on a route to one or the other destinations.

Referring now to FIG. 3, a schematic of an example of a computing node, which can be a cloud computing node 10 is illustrates. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the computer system that suppresses the rerouting functionality of a navigational system, as well as the navigational system itself, may comprise one or more computing nodes and may communicate with cloud computing nodes to execute the functionality described. The program code functionality describe in FIG. 1 may be executed on a cloud computing node 10 and/or on one or more general computing node, that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
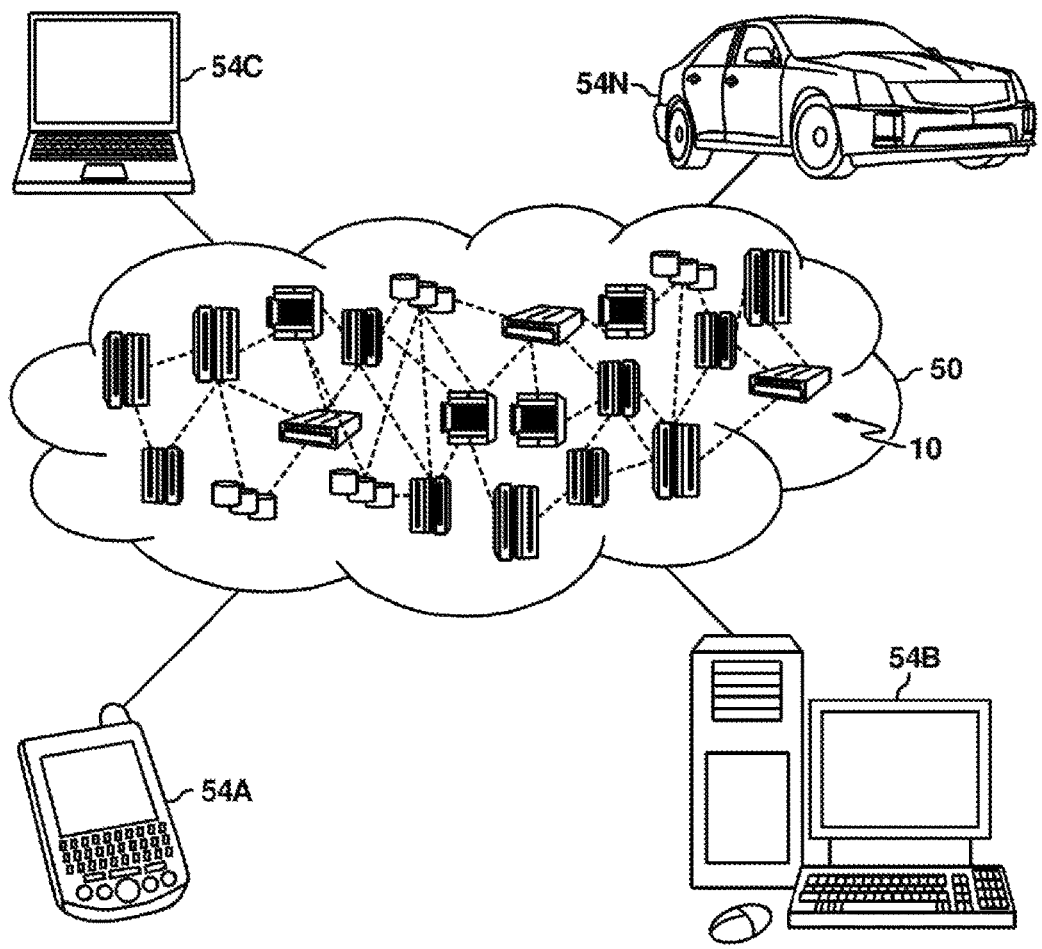
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
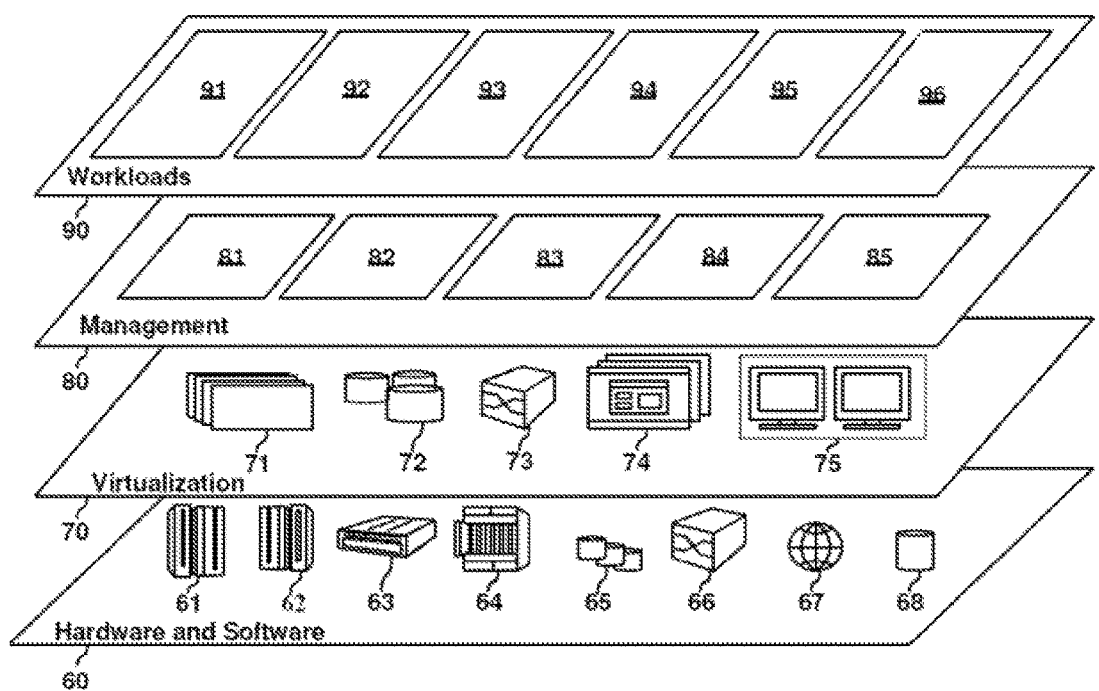
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and suppressing re-calculation of a route by a GPS navigational system 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    monitoring, by one or more processors, movements of a vehicle relative to a planned route generated by a navigational system, wherein the planned route comprises a trip from a point of origin to a destination and the navigational system comprises one or more programs providing navigational assistance to a driver during the trip, wherein providing navigational assistance comprises providing real-time visual guidance on a display;
    detecting, by the one or more processors, a first movement of the vehicle comprising a deviation from the planned route;
    automatically determining, by the one or more processors, that the deviation is based on an intentional circumstance, wherein the intentional circumstance is selected from the group consisting of: a condition related to the vehicle, a biological condition of an individual in the vehicle, and a decision to visit a known via point;
    based on the determining, suppressing, by the one or more processors, execution of one or more programs comprising rerouting functionality of the navigational system and pausing the one or more programs providing navigational assistance, wherein the suppressing comprises suppressing real-time visual guidance on the display by the navigational system;
    detecting, by the one or more processors, a second movement of the vehicle comprising a resumption of the planned route; and
    resuming, by the one or more processors, the one or more programs providing navigational assistance, wherein the resuming comprises resuming real-time visual guidance on the display by the navigational system.

2. The computer-implemented method of claim 1, wherein the monitoring comprises utilizing location services in the navigational system.

3. The computer-implemented method of claim 1, wherein the intentional circumstance is a condition related to the vehicle, and wherein the determining that the deviation is based on an intentional circumstance comprises:
    obtaining, by one or more processors, from a computing resource in the vehicle over a network connection, an indication of a safety issue related to the vehicle; and
    determining, based on the safety issue, that the deviation is to address the safety issue.

4. The computer-implemented method of claim 3, wherein the safety issue is selected from the group consisting of: a low fuel warning, a low air in a tire warning, and a low fluid warning.

5. The computer-implemented method of claim 1, wherein the intentional circumstance is a condition related to the vehicle, the method further comprising:
    monitoring, by the one or more processors, a fuel system in the vehicle; and
    obtaining, by the one or more processors, an indication that the fuel system is low on fuel, wherein the first movement is based on the intentional circumstance of refueling the vehicle.

6. The computer-implemented method of claim 5, wherein the detecting further comprises:
    obtaining, by the one or more processors, an indication that the fuel system is no longer low.

7. The computer-implemented method of claim 1, wherein the intentional circumstance is a decision to visit a known via point, the method further comprising:
    obtaining, by the one or more processors, parameters defining a location, wherein the determining comprises determining, by the one or more processors, based on the deviation, that the vehicle is proceeding toward the location during the trip.

8. The computer-implemented method of claim 7, wherein the determining that the vehicle is proceeding toward the location during the trip comprises:
    utilizing, by the one or more processors, the navigational system to locate the location; and determining, by the one or more processor, that the first movement positions the vehicle on a route to the location.

9. The computer-implemented method of claim 1, wherein the determining that the deviation is based on an intentional circumstance further comprises:
    requesting, by the one or more processors, confirmation that the deviation is based on an intentional circumstance; and
    obtaining, by the one or more processors, the confirmation.

10. The computer-implemented method of claim 9, wherein the confirmation comprises a voice command.

11. The computer-implemented method of claim of claim 1, further comprising:
    monitoring, by one or more processors, movements of a vehicle comprising deviations from the planned route;
    retaining, by the one or more processors, in at least one memory resource, other destinations visited by the vehicle based on the deviations.

12. The computer-implemented method of claim 11, wherein the intentional circumstance is a decision to visit a known via point, and wherein the determining that the deviation is based on an intentional circumstance comprises:
    determining, by the one or more processors, that the first movement positions the vehicle on a route to one or the other destinations.

13. A computer program product comprising:
    a non-transitory computer readable storage medium readable by one or more processors and storing instructions for execution by the one or more processors for performing a method comprising:
        monitoring, by one or more processors, movements of a vehicle relative to a planned route generated by a navigational system, wherein the planned route comprises a trip from a point of origin to a destination and the navigational system comprises one or more programs providing navigational assistance to a driver during the trip, wherein providing navigational assistance comprises providing real-time visual guidance on a display;
        detecting, by the one or more processors, a first movement of the vehicle comprising a deviation from the planned route;
        automatically determining, by the one or more processors, that the deviation is based on an intentional circumstance, wherein the intentional circumstance is selected from the group consisting of: a condition related to the vehicle, a biological condition of an individual in the vehicle, and a decision to visit a known via point;
        based on the determining, suppressing, by the one or more processors, execution of one or more programs comprising rerouting functionality of the navigational system and pausing the one or more programs providing navigational assistance, wherein the suppressing comprises suppressing real-time visual guidance on the display by the navigational system;
        detecting, by the one or more processors, a second movement of the vehicle comprising a resumption of the planned route; and
        resuming, by the one or more processors, the one or more programs providing navigational assistance, wherein the resuming comprises resuming real-time visual guidance on the display by the navigational system.

14. The computer program product of claim 13, wherein the monitoring comprises utilizing location services in the navigational system.

15. The computer program product of claim 13, wherein the intentional circumstance is a condition related to the vehicle, and wherein the determining that the deviation is based on an intentional circumstance comprises:
    obtaining, by one or more processors, from a computing resource in the vehicle over a network connection, an indication of a safety issue related to the vehicle; and
    determining, based on the safety issue, that the deviation is to address the safety issue.

16. The computer program product of claim 15, wherein the safety issue is selected from the group consisting of: a low fuel warning, a low air in a tire warning, and a low fluid warning.

17. The computer program product of claim 13, wherein the intentional circumstance is a condition related to the vehicle, the method further comprising:
    monitoring, by the one or more processors, a fuel system in the vehicle; and
    obtaining, by the one or more processors, an indication that the fuel system is low on fuel, wherein the first movement is based on the intentional circumstance of refueling the vehicle.

18. The computer program product of claim of claim 17, wherein the detecting further comprises:
    obtaining, by the one or more processors, an indication that the fuel system is no longer low.

19. A system comprising:
    a memory;
    one or more processors in communication with the memory; and
    program instructions executable by the one or more processors via the memory to perform a method, the method comprising:
        monitoring, by the one or more processors, movements of a vehicle relative to a planned route generated by a navigational system, wherein the planned route comprises a trip from a point of origin to a destination and the navigational system comprises one or more programs providing navigational assistance to a driver during the trip, wherein providing navigational assistance comprises providing real-time visual guidance on a display;
        detecting, by the one or more processors, a first movement of the vehicle comprising a deviation from the planned route;
        automatically determining, by the one or more processors, that the deviation is based on an intentional circumstance, wherein the intentional circumstance is selected from the group consisting of: a condition related to the vehicle, a biological condition of an individual in the vehicle, and a decision to visit a known via point;
        based on the determining, suppressing, by the one or more processors, execution of one or more programs comprising rerouting functionality of the navigational system and pausing the one or more programs providing navigational assistance, wherein the suppressing comprises suppressing real-time visual guidance on the display by the navigational system;
        detecting, by the one or more processors, a second movement of the vehicle comprising a resumption of the planned route; and
        resuming, by the one or more processors, the one or more programs providing navigational assistance, wherein the resuming comprises resuming real-time visual guidance on the display by the navigational system.

\* \* \* \* \*